(12) United States Patent
Abel

(10) Patent No.: US 7,489,499 B2
(45) Date of Patent: Feb. 10, 2009

(54) LIGHTING CONTROL HAVING A CAPTURED OFFSET LINEAR GUIDE SYSTEM

(75) Inventor: Ryan L Abel, Easton, PA (US)

(73) Assignee: Lutron Electronics Co., Ltd., Coopersburg, PA (US)

( * ) Notice: Subject to any disclaimer, the term of this patent is extended or adjusted under 35 U.S.C. 154(b) by 416 days.

(21) Appl. No.: 11/429,755

(22) Filed: May 8, 2006

(65) Prior Publication Data

US 2006/0255662 A1    Nov. 16, 2006

Related U.S. Application Data

(60) Provisional application No. 60/680,218, filed on May 12, 2005.

(51) Int. Cl.
*H05K 5/00* (2006.01)
*H01C 10/30* (2006.01)
*H01H 15/00* (2006.01)

(52) U.S. Cl. ............... 361/679; 338/160; 323/905; 315/DIG. 4

(58) Field of Classification Search ........... 323/905; 315/209 R, 291, 298, DIG. 4; 338/68, 70–74, 338/78, 160, 172, 176; 361/600, 605, 622, 361/643, 679, 748, 752, 756; 200/531, 536, 200/541, 547, 549, 563
See application file for complete search history.

(56) References Cited

U.S. PATENT DOCUMENTS

| | | | |
|---|---|---|---|
| 3,746,923 A | 7/1973 | Spira et al. | |
| 4,187,528 A | 2/1980 | Morriss | |
| 4,695,820 A | 9/1987 | D'Aleo et al. | |
| 4,742,188 A | 5/1988 | Buehler et al. | |
| 4,783,581 A | 11/1988 | Flowers et al. | |
| 4,803,380 A | 2/1989 | Jacoby, Jr. et al. | |
| 4,833,277 A | 5/1989 | Jacoby, Jr. et al. | |
| 4,924,349 A | 5/1990 | Buehler et al. | |
| 4,939,383 A | 7/1990 | Tucker et al. | |
| 4,947,054 A | 8/1990 | Flowers et al. | |
| 5,030,893 A * | 7/1991 | Spira et al. | 315/294 |
| 5,068,639 A * | 11/1991 | Swanson et al. | 338/179 |
| 5,191,971 A | 3/1993 | Hakkarainen et al. | |
| 6,005,308 A * | 12/1999 | Bryde et al. | 307/157 |
| 6,774,328 B2 * | 8/2004 | Adams et al. | 200/329 |

FOREIGN PATENT DOCUMENTS

EP    0 352 920 A2    1/1990

OTHER PUBLICATIONS

International Search Report dated Jan. 16, 2007.

* cited by examiner

*Primary Examiner*—Matthew V Nguyen
(74) *Attorney, Agent, or Firm*—Ostrolenk, Faber, Gerb & Soffen, LLP

(57) ABSTRACT

A captured offset linear guide system for a lighting control device includes a faceplate having an elongated slot, a knob, an offset member, and a linear potentiometer. The offset member allows the linear potentiometer to be offset from the elongated slot of the faceplate to prevent dirt and dust from collecting on the potentiometer. Also, the offset linear guide system prevents insertion of an object into the internal structure of the lighting control device where it might come into contact with energized electrical components. The faceplate includes two guide rails, which hold the offset member close to the faceplate and allow for easy assembly of the faceplate to the lighting control device. Further, the faceplate includes an alignment rail, which prevents the offset member from rotating and further constrains the offset member to move in a straight line within the slot.

18 Claims, 7 Drawing Sheets

LIGHTING CONTROL HAVING A CAPTURED OFFSET LINEAR GUIDE SYSTEM

RELATED APPLICATIONS

This application is related to and claims the benefit and priority of commonly-assigned U.S. Provisional Application Ser. No. 60/680,218, filed May 12, 2005, having the same title as the present application, the entire disclosure of which is herein incorporated by reference.

BACKGROUND OF THE INVENTION

1. Field of the Invention

The present invention relates to lighting control devices, specifically lighting control devices having linear sliders.

2. Description of the Related Art

Many control devices incorporate linear slide mechanisms on a user interface to allow a continuous range of adjustment of a characteristic of the device being controlled. For example, many residential dimmers include linear sliders for continuous control of the intensity of a connected lamp from a minimum to a maximum value. Also, theatrical stageboards include many sliders for modification of the intensities, colors, and other characteristics of the theatrical lights during a performance. Finally, many audio electronic devices include linear slides for tuning of the volume of the audio output of the device.

Most prior art slider controls consist of a linear slide potentiometer, a faceplate mounted over the potentiometer, and an actuation member coupled to the potentiometer through a slot in the faceplate for adjusting the linear potentiometer. Typically, the potentiometer is part of a resistive divider and adjustment of the potentiometer will change the output voltage of the resistive divider. The output voltage is provided to a control circuit that will change the characteristic of the controlled device in response to changes in the output voltage of the resistive divider.

Because the location of the slot of prior art slider controls is positioned immediately above the potentiometer, it is common for dirt and dust to build up on the potentiometer. This can cause intermittent behavior of the potentiometer, require periodic cleaning of the slider control, and decrease the lifetime of the potentiometer. Also, since dimmers are connected to line-voltage potentials, the elongated slot in the faceplate can pose a safety issue if a conductive tool, such as a screwdriver, is inserted into the slot and makes contact with the potentiometer and other electrical components of the dimmer.

Some prior art dimmers have included actuation members that provide barrier structures between the slot and the potentiometer. An example of such a dimmer is described in greater detail in commonly-assigned U.S. Pat. No. 6,000,308, issued Dec. 21, 1999, entitled ELECTRICAL SWITCH AND DIMMER CONTROL DEVICE, the entire disclosure of which is hereby incorporated by reference. The actuation member of the dimmer includes a long body portion that extends immediately behind the slot. However, since the body must be situated between the slot and the potentiometer when the adjustment member is positioned at both ends of the slot. Therefore, the body of the actuation member must be substantially twice as long as the length of the elongated slot, which limits the length of the slot. It is desirable to increase the length of the slot as much as possible to enhance the level of intensity control provided by the dimmer.

Thus, there exists a need for a slider control having an increased slot length, wherein the potentiometer is protected from dirt and dust build-up and from tools making contact with the internal electrical components from the outside of the device.

SUMMARY OF THE INVENTION

According to the present invention, a captured offset linear guide system for a lighting control device includes a faceplate, a knob, an offset member, and a linear potentiometer. The faceplate includes an elongated slot that is positioned along a longitudinal axis. The linear potentiometer is positioned along an axis that is parallel to and offset in a lateral direction from the elongated slot. The knob is positioned to the front of the faceplate and extends through the elongated slot to couple to the offset member, which couples to the linear potentiometer.

Further, the knob has a narrow portion that extends along an axis substantially perpendicular to the plane of the front surface of the faceplate through the elongated slot to make connection with the offset member. The offset member includes a post that extends along an axis substantially perpendicular to the plane of the front surface of the faceplate. The post of the offset member contacts an adjustment member of the linear potentiometer. The axis of the post of the offset member is parallel to the axis of the narrow portion of the knob, yet offset in a lateral direction such that the axis of the post does not intersect with the elongated slot.

In a preferred embodiment of the present invention, the faceplate further comprises two guide rails and an alignment rail all parallel to the longitudinal axis of the elongated slot. The offset member is held close to the faceplate by the guide rails and is operable to move along the longitudinal axis from one end of the elongated slot to the other end. The offset member includes a groove for coupling to the alignment rail so that the offset member does not become misaligned when moving along the longitudinal axis.

DETAILED DESCRIPTION OF THE INVENTION

Figure 1:
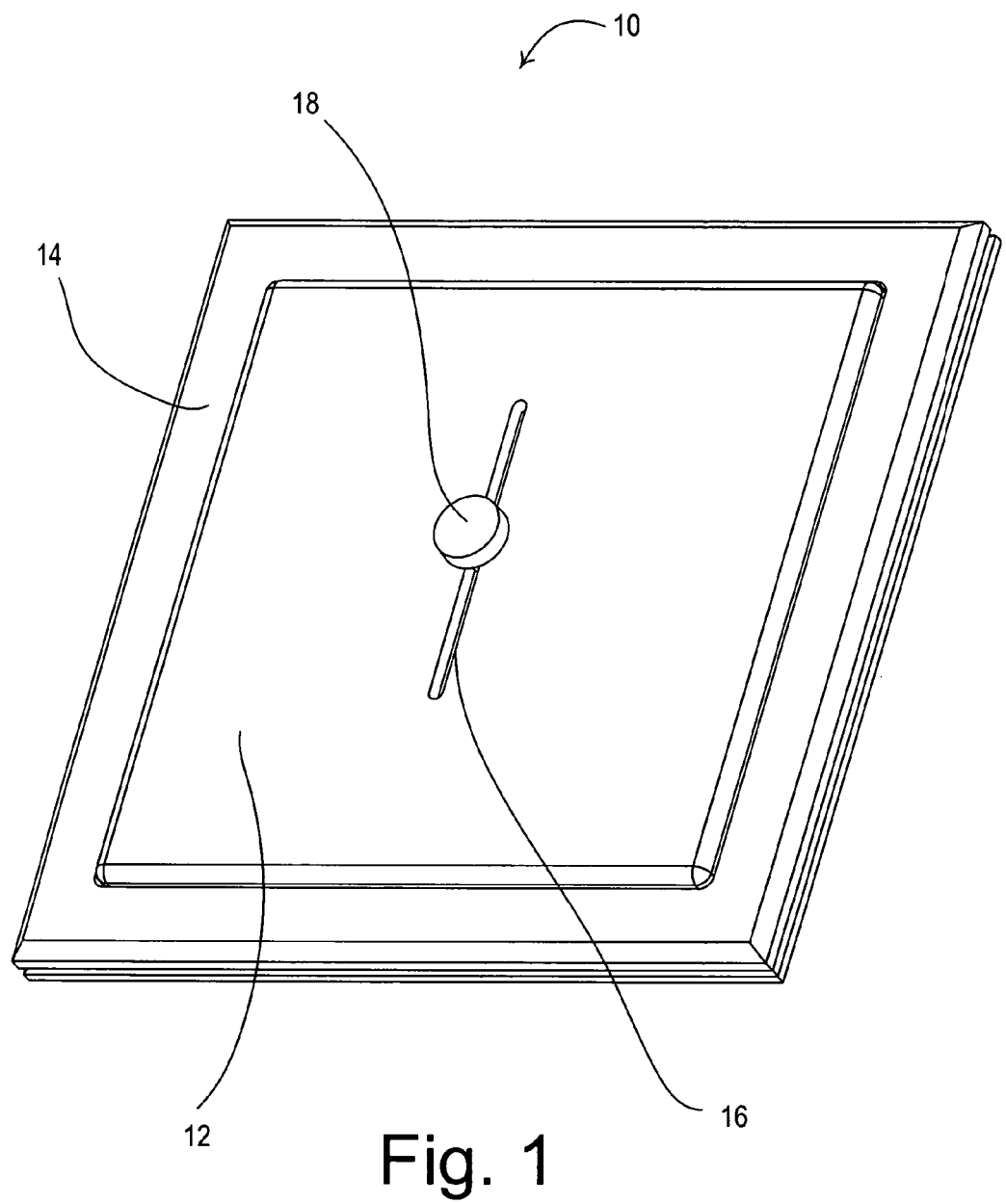
FIG. 1 is a perspective view of a lighting control device according to the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 shows a perspective view of a lighting control device 10 according to the present invention. A faceplate 12 of the lighting control device 10 is provided surrounded by an frame 14. The faceplate 12 includes an elongated slot 16. A knob 18 is provided for a user interface for the lighting control device. The lighting control device 10 may be a dimmer which is connected in series between an alternating-current (AC) power source and a lighting load and includes a semiconductor switch for controlling the intensity of the lighting load. Also, the lighting control device 10 may be a low-voltage device that connects to a control link and communicates digital signals to a central processor, which is connected to a remote dimming module. In both systems, moving the knob 18 to the top of the elongated slot 16 will increase the intensity of the controlled lighting loads and moving the knob 18 to the bottom of the elongated slot 16 will decrease the intensity of the controlled lighting loads.

Figure 2:
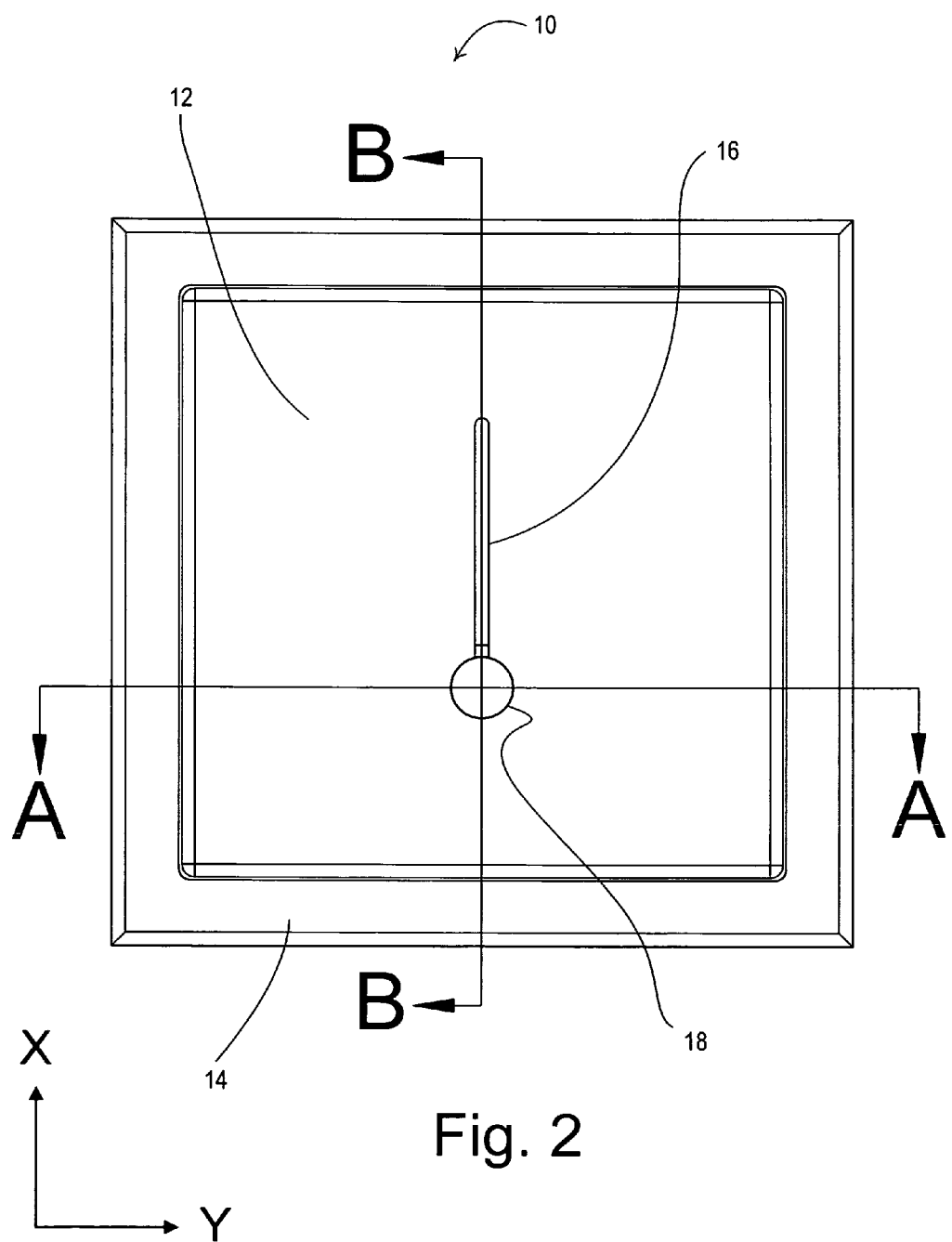
FIG. 2 is a front view of the lighting control device of FIG. 1.
Figure 3:
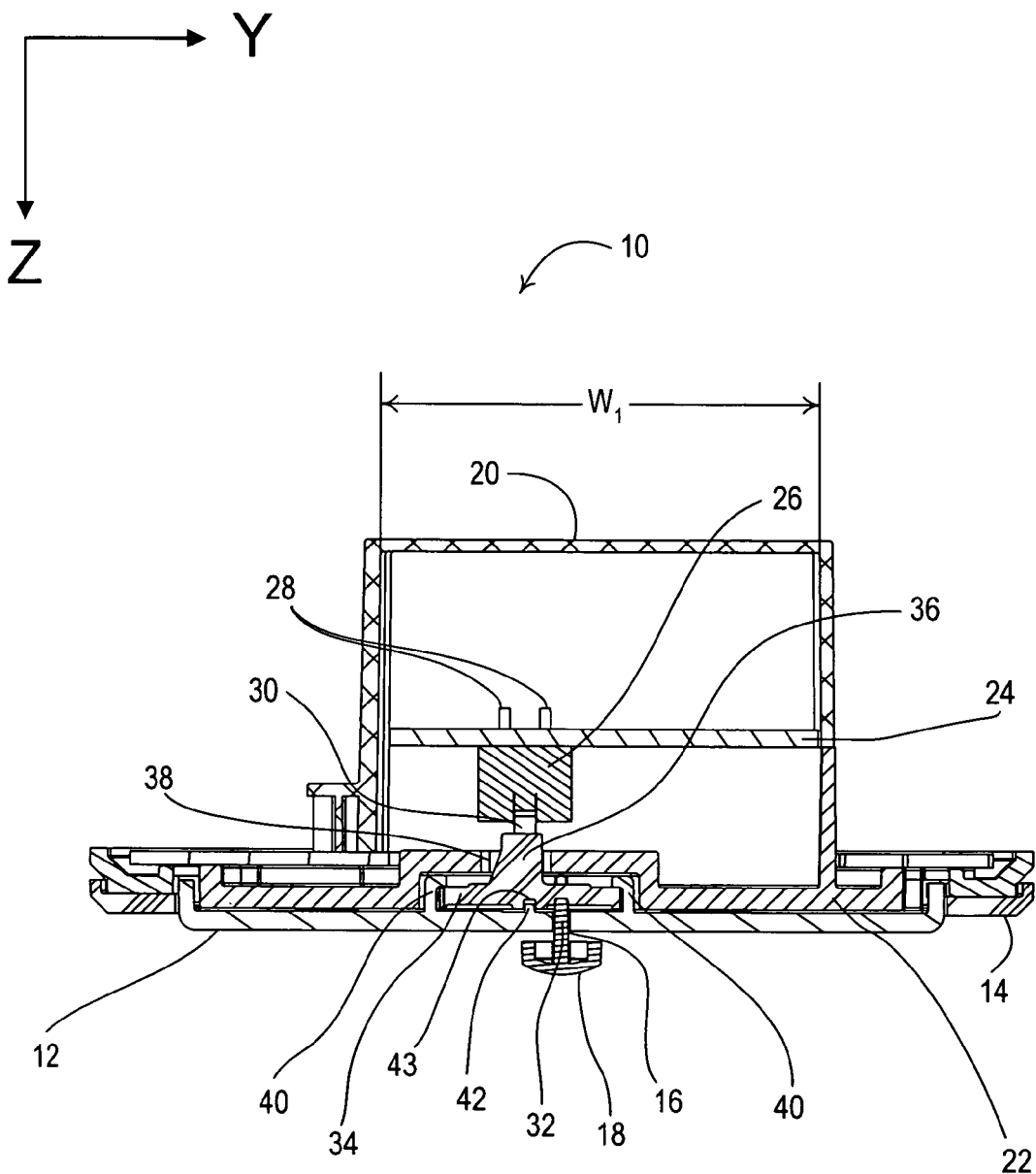
FIG. 3 is a sectional view taken along line A-A in FIG. 2.

FIG. 2 shows a front view of the lighting control device 10 of FIG. 1. A sectional view taken along line A-A in FIG. 2 is shown in FIG. 3. A back cover 20 and a bezel 22 together form the outer enclosure of the lighting control device 10. The back cover 20 has an interior width $W_1$. The faceplate 12 and the frame 14 connect to the bezel 22. A printed circuit board (PCB) 24, which includes the electrical components of the lighting control device, is housed inside and is supported by the back cover 20 and the bezel 22. A linear potentiometer 26 is mounted on the PCB 24 with electrical connections made through leads 28. Movement of an adjustment member 30 of the linear potentiometer 26 will cause the resistance between two of the leads 28 to change.

The knob 18 has a narrow portion 32 that extends through the elongated slot 16 of the faceplate 12 and attaches to an offset member 34. The offset member 34 includes a post 36 that makes contact with the adjustment member 30 of the linear potentiometer 26 through a slot 38 in the bezel 22. The offset member 34 allows a movement of the knob 18 to change the position of the adjustment member 30 and thus change the resistance between the leads 28 of the potentiometer 26.

The offset member 34 is held in close proximity with the faceplate 12 by two guide rails 40, i.e. the offset member is "captured" by the guide rails. The guide rails 40 allow the offset member 34 (and the knob 18) to move freely along an axis perpendicular to the plane of the drawing of FIG. 3 (i.e., parallel to the x-axis of FIG. 2), but not in directions parallel to the y-axis or the z-axis. An alignment rail 42 extending parallel to the slot 16 is provided on the back surface of the faceplate 12 along the x-axis. The alignment rail 42 couples with a groove 43 in the offset member 34 to prevent misalignment or rotation of the offset member while the offset member is moving along the x-axis (i.e. along the length of the elongated slot 16).

Figure 4:
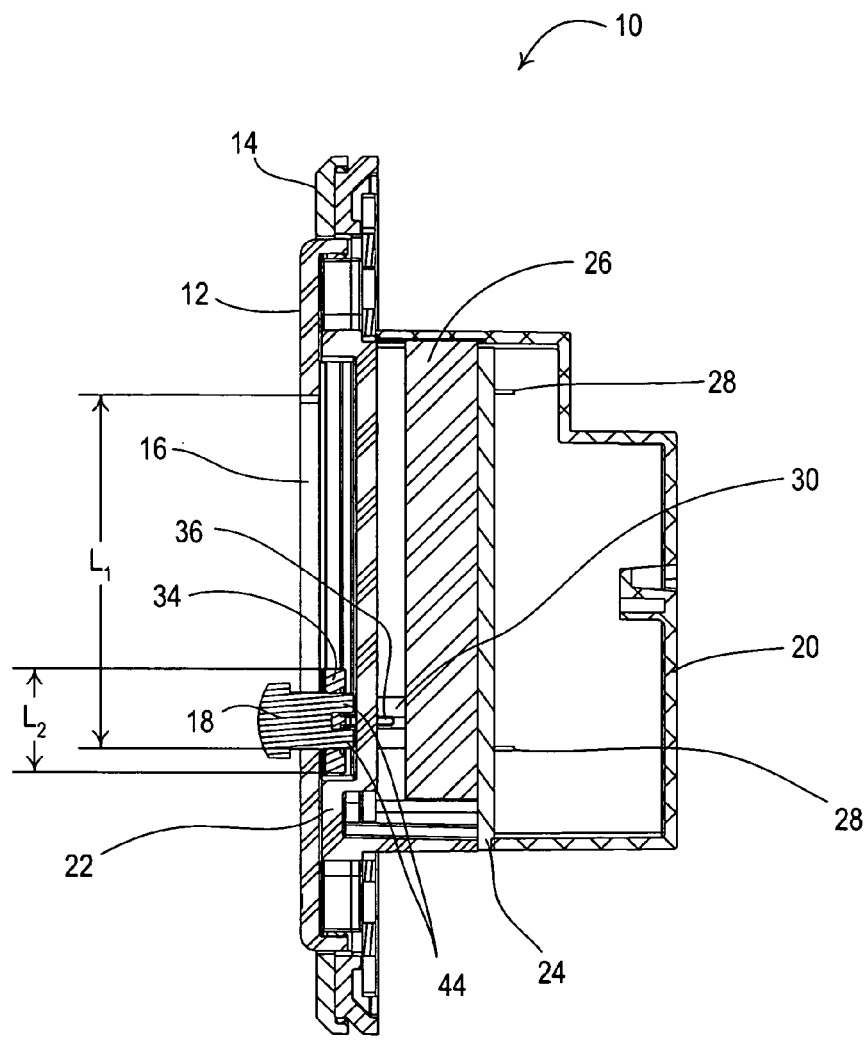
FIG. 4 is a sectional view taken along line B-B in FIG. 2.
Figure 4:
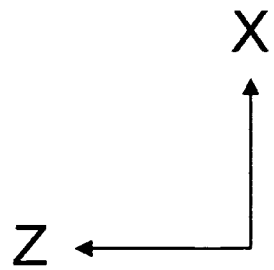

Referring to FIG. 4, a sectional view taken along line B-B in FIG. 2 is shown. As shown, the body of the potentiometer 26 extends for the length of the PCB 24 and the slot 16 has a length $L_1$. The offset member 34 is located between the faceplate 12 and the bezel 22 and has a length $L_2$ (in the direction of the x-axis). The length $L_2$ of the offset member 34 is substantially less than the length $L_1$ of the slot 16, e.g., the length $L_2$ is less than one third (⅓) of the length $L_1$. The post 36 of the offset member 34 fits into a notch in the adjustment member 30 of the potentiometer 26. The knob 18 is able to move over the length of the elongated slot 16. The knob 18 is connected to the offset member 34 by two posts 44 through a heat-staking process. The heat-staking process involves melting the ends of the posts 44 and then cooling the posts such that the ends take a different shape and the posts remain in connection with the offset member 32.

Because the narrow portion 32 of the knob 18 and the post 36 of the offset member 34 are not aligned, the bezel 22 is located immediately behind the elongated slot 16, i.e., the bezel 22 defines a fixed barrier between the slot and the potentiometer 26. This permits only an indirect, circuitous spatial path from the elongated slot 16 to the PCB 24 and the linear potentiometer 26 inside the lighting control device 10. There is no direct path from the slot 16 to the PCB 24 and the potentiometer 26. The offset nature of the guide system allows for some advantages over the prior art. First, with the offset design of the present invention, it is much more difficult for dust and dirt to get inside of the lighting control device 10 and onto the linear potentiometer 26. Thus, minimal cleaning is needed and the potentiometer 26 will have a longer lifetime. Next, the since there is not a straight path from the elongated slot 16 to the potentiometer 26 and other internal electrical components on the PCB 24, it is not possible to insert a tool into the lighting control device 10 to cause an unsafe condition. Finally, since the bezel 22 is positioned between the elongated slot 16 and the PCB 24 and the internal structure of the lighting control device 10 cannot be seen by a user, the lighting control device 10 provides an improved aesthetic over prior art slider controls.

Figure 5A:
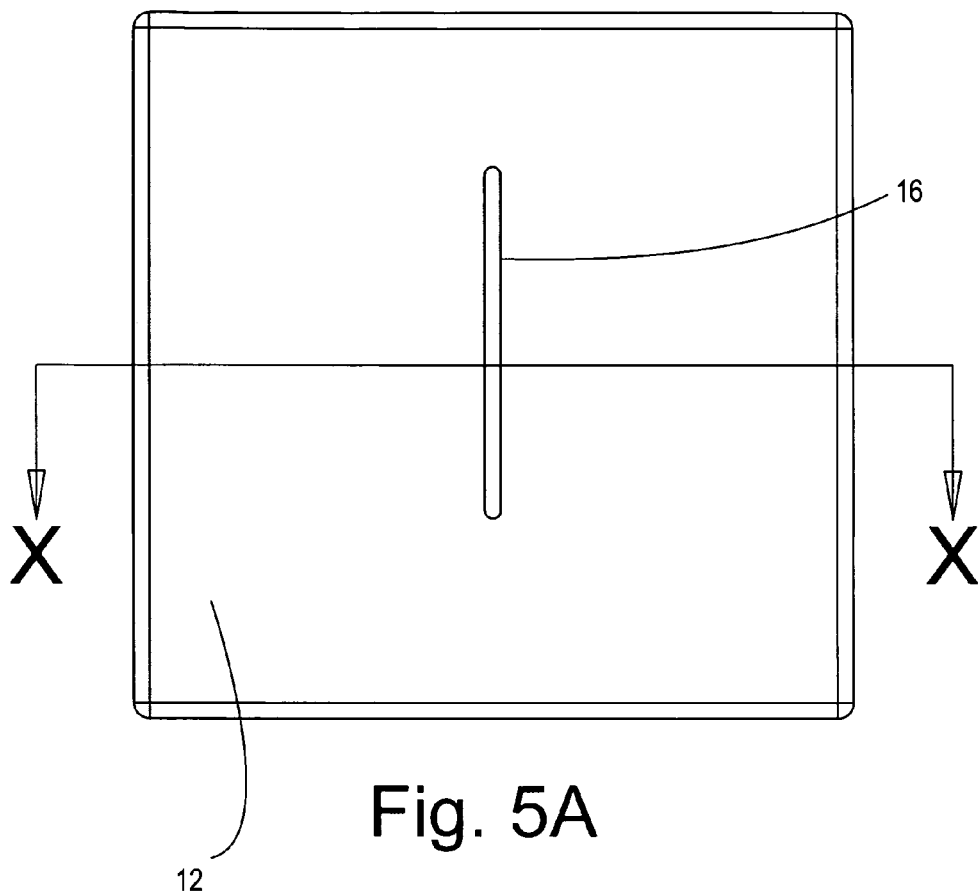
FIG. 5A is a front view of the faceplate of the lighting control device of FIG. 1.
Figure 5B:
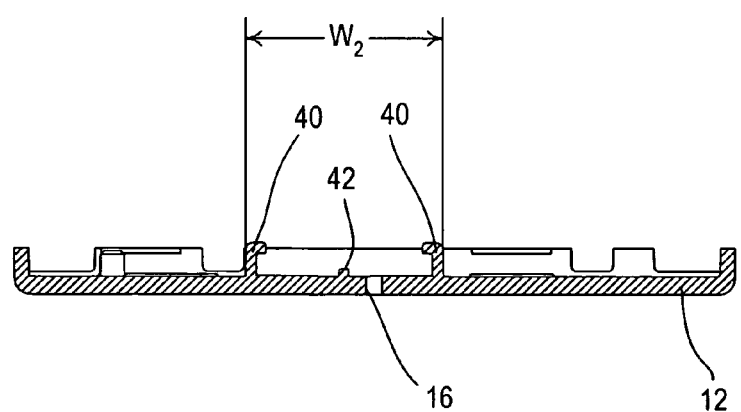
FIG. 5B is a sectional view taken along line X-X in FIG. 5A.

A front view of the faceplate 12 detached from the lighting control device 10 is shown in FIG. 5A. A sectional view taken along line X-X in FIG. 5A is shown in FIG. 5B. The guide rails 40 and the alignment rail 42 can be seen. The guide rails 40 define an outer width $W_2$ of the offset linear guide system of the present invention.

Figure 6:
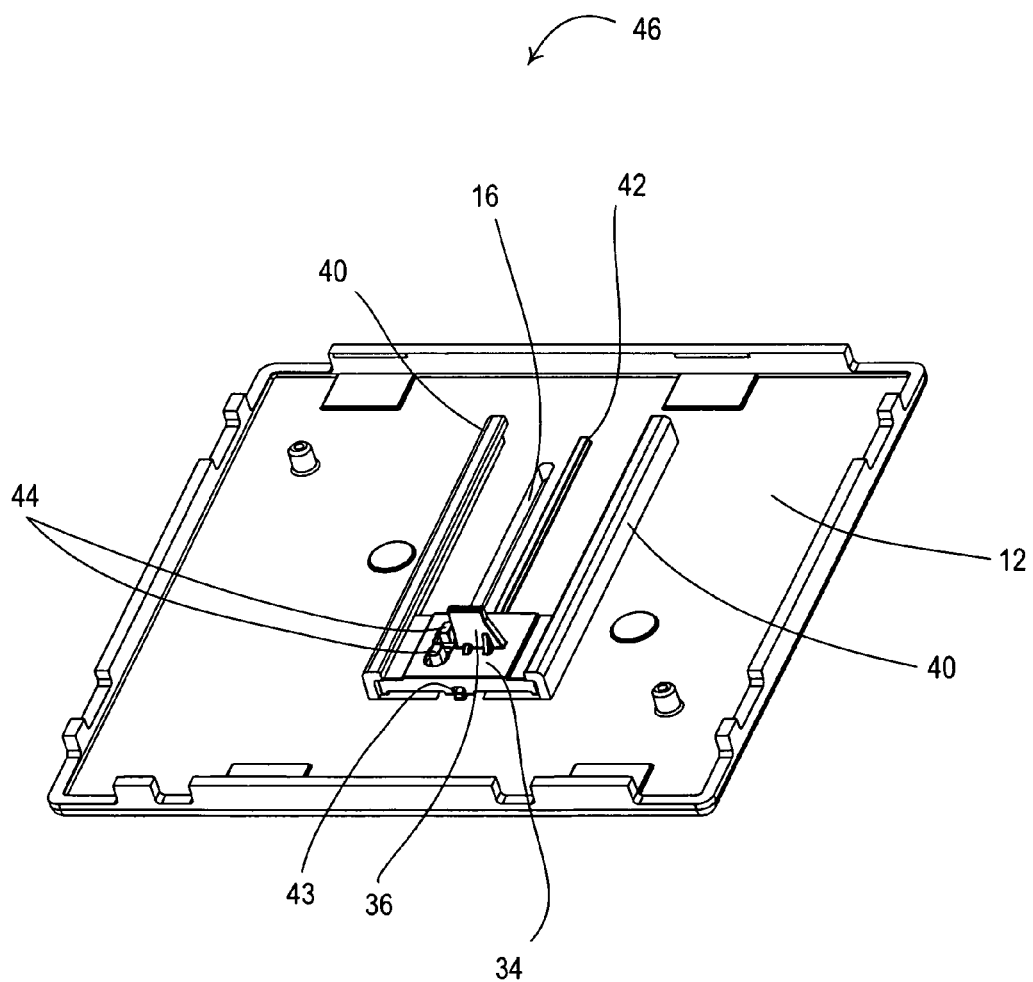
FIG. 6 is a rear perspective view of the faceplate assembly of the lighting control device of FIG. 1.

FIG. 6 is a perspective view of the faceplate assembly 46 consisting of the faceplate 12, the offset member 34, and the knob 18, viewed from the rear, bottom, and right sides of the faceplate. The posts 44 of the knob 18 extend through the offset member 34 to connect the offset member to the knob. The offset member 34 is held close to the faceplate 12 by the guide rails 40. The guide rails 40 and the alignment rail 42 are slightly longer in length than the elongated slot 16, such that the knob 18 is able to move from one end of the slot to the other.

Because of the guide rails 40 and the connection between the offset member 32 and the knob 18, the faceplate assembly 46 remains assembled when removed from the lighting control device 10. This allows for easy connection of the faceplate assembly 46 to the lighting control device 10 during the manufacturing process and after installation of the lighting control. Also, the faceplate assembly 46 permits a simple means for shipping replacement faceplates to the field.

Figure 7:
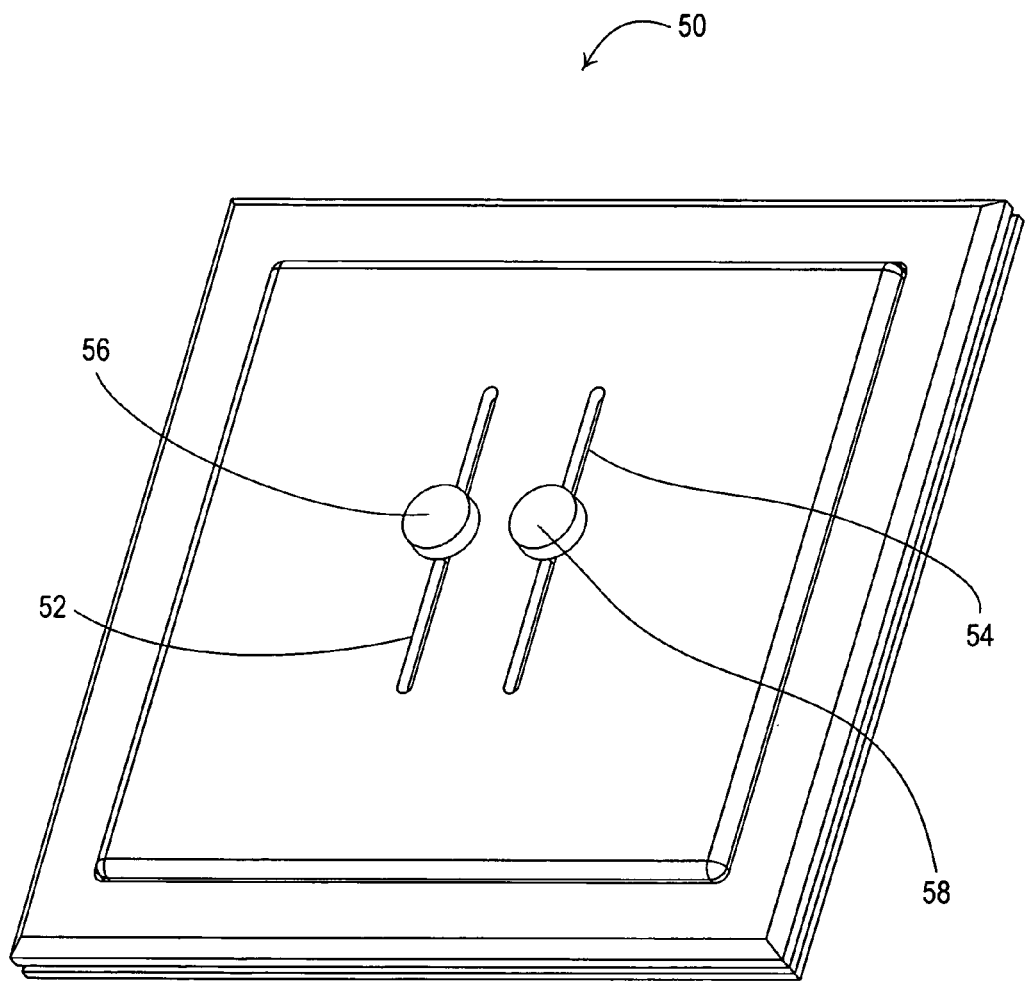
FIG. 7 is a perspective view of a dual slider lighting control device according to the present invention.

The linear offset guide system of the present invention allows for implementation of a dual slider lighting control device 50 shown in FIG. 7. The since the width $W_2$ of the offset linear guide system (shown in FIG. 5B) is less that approximately half of the interior width $W_1$ of the enclosure 20 shown in FIG. 3, two offset linear guide systems can be positioned side-by-side on the lighting control device 50. Accordingly, the dual slider lighting control device 50 comprises two elongated slots 52, 54 having two knobs 56, 58. The dual slider lighting control device 50 is operable to be connected to two separate lighting loads (not shown) to provide for separate control of the lighting loads via the two knobs 56, 58.

An additional unexpected benefit of the present design is that the movement of the knob along the elongated slot has an exceptional feel. The alignment rail 42 prevents the offset member 34 from rotating during movement along the slot, which eliminates unnecessary friction of the offset member 34 with the guide rails 40. Further, the guide rails 40 provide a smooth surface for the offset member 34 to move across during travel.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An offset linear guide system for a lighting control device, comprising:
   a faceplate having an elongated slot extending in a longitudinal direction;
   a knob having a post that extends through the elongated slot of the faceplate, the post operable to move along the elongated slot;
   a potentiometer having an adjustment member and positioned along a first axis parallel to and offset in a lateral direction from the elongated slot; and
   an offset member coupled between the post of the knob and the adjustment member of the potentiometer, the offset member having a length in the longitudinal direction, the length of the offset member substantially less than the length of the elongated slot;
   wherein the adjustment member of the potentiometer moves in response to a movement of the knob.

2. The system of claim 1, wherein the faceplate comprises a front surface and a rear surface, and the system further comprises:
   a first guide rail and a second guide rail, the first and second guide rails positioned on the rear surface of the faceplate along a second axis and a third axis, respectively, the second axis and the third axis each being parallel to and offset in a lateral direction from the elongated slot;
   wherein the offset member is captured by the first and second guide rails such that the offset member is operable to move along substantially the first axis.

3. The system of claim 2, further comprising:
   an alignment member positioned on the rear surface of the faceplate substantially along the first axis;
   wherein the offset member further comprises a groove operable to receive the alignment member, such that the offset member is prevented from rotating.

4. The system of claim 1, further comprising:
   a bezel having a second slot and operable to be positioned between the faceplate and the potentiometer such that the second slot is substantially positioned along the first axis, the bezel located immediately behind the elongated slot such that there is no direct path from the elongated slot to the potentiometer.

5. The system of claim 4, wherein the bezel defines a fixed barrier between the slot and the potentiometer.

6. The system of claim 1, wherein a resistance of the potentiometer changes in response to a movement of the knob.

7. The system of claim 1, wherein the offset member comprises a post operable to be coupled to an adjustment member of a potentiometer of the lighting control device.

8. A faceplate assembly for a lighting control device, comprising:
   a faceplate having a front surface, a rear surface, and an elongated slot providing an opening through the faceplate from the front surface to the rear surface;
   a knob having a post that extends through the elongated slot of the faceplate, the post operable to move along the elongated slot;
   a first guide rail and a second guide rail, the first and second guide rails positioned on the rear surface of the faceplate along a first axis and a second axis, respectively, the first axis and the second axis each being parallel to and offset in a lateral direction from the elongated slot;
   an offset member coupled to the post of the knob and captured by the first and second guide rails such that the offset member is operable to move along substantially a third axis parallel to and offset in a lateral direction from the elongated slot.

9. The faceplate assembly of claim 8, further comprising:
   an alignment member positioned on the rear surface of the faceplate substantially along the third axis;
   wherein the offset member further comprises a groove operable to receive the alignment member, such that the offset member is prevented from rotating.

10. The faceplate assembly of claim 8, wherein the offset member comprises a post operable to be coupled to an adjustment member of a potentiometer of the lighting control device.

11. A lighting control device operable to control the intensity of a lighting load, the lighting control device comprising:
    a faceplate having an elongated slot extending in a longitudinal direction;
    a knob having a post that extends through the elongated slot of the faceplate, the post operable to move along the elongated slot;
    a potentiometer having an adjustment member and positioned along a first axis parallel to and offset in a lateral direction from the elongated slot; and
    an offset member coupled between the post of the knob and the adjustment member of the potentiometer, the offset member having a length in the longitudinal direction, the length of the offset member substantially less than the length of the elongated slot;
    wherein the adjustment member of the potentiometer moves in response to a movement of the knob.

12. The lighting control device of claim 11, wherein the faceplate comprises a front surface and a rear surface, and the lighting control device further comprises:
    a first guide rail and a second guide rail, the first and second guide rails positioned on the rear surface of the faceplate along a second axis and a third axis, respectively, the second axis and the third axis each being parallel to and offset in a lateral direction from the elongated slot;
    wherein the offset member is captured by the first and second guide rails such that the offset member is operable to move along substantially the first axis.

13. The lighting control device of claim 12, further comprising:
    an alignment member positioned on the rear surface of the faceplate substantially along the first axis;
    wherein the offset member further comprises a groove operable to receive the alignment member, such that the offset member is prevented from rotating.

14. The lighting control device of claim 12, wherein the faceplate comprises a second elongated slot parallel tot he first elongated slot and extending in the longitudinal direction, and the lighting control device further comprises:
    a second knob having a post that extends through the second elongated slot of the faceplate, the post operable to move along the second elongated slot;

a second potentiometer having an adjustment member and positioned along a fourth axis parallel to and offset in a lateral direction from the second elongated slot; and a second offset member coupled between the post of the second knob and the adjustment member of the second potentiometer such that the adjustment member of the second potentiometer moves in response to a movement of the second knob, the second offset member having a length in the longitudinal direction, the length of the second offset member substantially less than the length of the second elongated slot; and a third guide rail and a fourth guide rail, the third and fourth guide rails positioned on the rear surface of the faceplate along a fifth axis and a sixth axis, respectively, the fifth axis and the sixth axis each being parallel to and offset in a lateral direction from the second elongated slot;

wherein the second offset member is captured by the third and fourth guide rails such that the offset member is operable to move along substantially the fourth axis.

15. The lighting control device of claim 12, further comprising:

a bezel having a second slot and operable to be positioned between the faceplate and the potentiometer such that the second slot is substantially positioned along the first axis, the bezel located immediately behind the elongated slot such that there is no direct path from the elongated slot to the potentiometer.

16. The lighting control device of claim 15, wherein the bezel defines a fixed barrier between the slot and the potentiometer.

17. The lighting control device of claim 11, wherein a resistance of the potentiometer changes in response to a movement of the knob.

18. The lighting control device of claim 11, wherein the intensity of the lighting load is controlled in response to a movement of the knob.

* * * * *